United States Patent [19]
Kondo et al.

[11] Patent Number: 5,769,657
[45] Date of Patent: Jun. 23, 1998

[54] ATTACHMENT STRUCTURE OF BATTERY PACK TO POWER-DRIVEN TOOLS

[75] Inventors: Masayoshi Kondo; Takahide Kawakami; Norio Isogai; Youichi Kato; Katsumi Tozawa, all of Anjo, Japan

[73] Assignee: Makita Corporation, Aichi-pref., Japan

[21] Appl. No.: 604,869

[22] Filed: Feb. 22, 1996

[30] Foreign Application Priority Data

| Feb. 23, 1995 | [JP] | Japan | 7-035745 |
| Feb. 23, 1995 | [JP] | Japan | 7-035748 |
| Feb. 23, 1995 | [JP] | Japan | 7-035755 |
| Jan. 16, 1996 | [JP] | Japan | 8-005290 |

[51] Int. Cl.$^6$ ................................................. H01R 3/00
[52] U.S. Cl. ................................................. 439/500; 320/2
[58] Field of Search ........................... 439/825, 500, 439/627, 929, 699.1; 320/2

[56] References Cited

U.S. PATENT DOCUMENTS

| 4,186,983 | 2/1980 | Kaye . | |
| 4,447,749 | 5/1984 | Reeb, Jr. et al. | 310/71 |
| 4,709,974 | 12/1987 | Hawkins | 439/345 |
| 4,829,226 | 5/1989 | Nakamura et al. | 320/35 |
| 4,835,410 | 5/1989 | Bhagwat et al. | 307/64 |
| 5,144,217 | 9/1992 | Gardner et al. | 320/2 |
| 5,148,094 | 9/1992 | Parks et al. | 320/2 |
| 5,391,972 | 2/1995 | Gardner et al. | 320/2 |

FOREIGN PATENT DOCUMENTS

| 0 255 568 | 2/1988 | European Pat. Off. . |
| 9404008 | 9/1994 | Germany . |

Primary Examiner—Neil Abrams
Assistant Examiner—Eugene G. Byrd
Attorney, Agent, or Firm—Lahive & Cockfield, LLP

[57] ABSTRACT

A simple attachment structure of the present invention ensures favorable connection of a battery pack with a battery holder in a power-driven tool over a long time period without causing any defective contact. A pair of side slots (47a,47b) as well as a pair of insertion slots (48a,48b) are formed in a connection surface (49) of an upper battery case (20) of a battery pack (10). Electrode terminal assemblies (41a,41b) are set in the side slots (47a,47b) and the insertion slots (48a,48b) to be exposed on the two side faces thereof. A positive spring terminal (64a) and a negative spring terminal (64b) are integrally joined with and supported by a terminal base 61 of a battery holder (60). Each spring terminal (64a,64b) has an insertion element (66a,66b) formed to have a width a little greater than the width of the insertion slot (48a,48b). When the spring terminals (64a, 64b) are inserted into the insertion slots (48a,48b), the elasticity of the spring terminals (64a,64b) presses the insertion elements (66a,66b) thereof against the electrode terminal assemblies (41a,41b). This realizes electrical connection of the spring terminals (64a,64b) with the electrode terminal assemblies (41a,41b) and enables the battery pack (10) to be integrally joined with the battery holder (60) of the power-driven tool.

27 Claims, 11 Drawing Sheets

ATTACHMENT STRUCTURE OF BATTERY PACK TO POWER-DRIVEN TOOLS

BACKGROUND OF THE INVENTION

1. Field of the Invention

The present invention relates to a novel attachment structure which allows a battery pack including secondary cells to be detachably attached to a battery holder in a power-driven tool.

2. Description of the Related Art

FIG. 14 is a cross sectional view illustrating a conventional attachment structure to make a battery pack connected with a battery holder in a power-driven tool. Referring to FIG. 14, a battery pack 210 including a plurality of secondary cells (not shown) is inserted upward into a predetermined accommodation space in a handle assembly 250 of a power-driven tool (not fully shown). The predetermined accommodation space in the handle assembly 250 is defined by a pair of housing members 250a and 250b. Simultaneously with the accommodation of the battery pack 210 into the predetermined accommodation space in the handle assembly 250, positive and negative electrode terminal assemblies 241a and 241b arranged on the top end portion of the battery pack 210 (in FIG. 14) are respectively engaged with positive and negative spring terminals 264a and 264b projected from a terminal base 261 of a battery holder 260 fixed to the handle assembly 250. This structure holds the upper portion of the battery pack 210 and enables the battery pack 210 to be electrically connected with the power-driven tool.

The conventional attachment structure described above, however, limits the contact areas of the electrode terminal assemblies 241a and 241b with the spring terminals 264a and 264b. The contact areas determine the capacity of the flow of electric charge. In power-driven tools having a relatively large motor, such as vibrating drills and power-driven hammers, a large contact resistance exists between the spring terminals 264a and 264b and the electrode terminal assemblies 241a and 241b. Especially in the vibrating drills, the large contact resistance often causes chattering (rapid intermittent noise) at the contact, which may result in a defective contact. This further increases the contact resistance, and the resulting generation of heat may fuse a terminal holder, which is made of a synthetic resin and supports the pair of electrode terminal assemblies 241a and 241b, or shorten the life of the secondary batteries included in the battery pack 210.

The electrode terminal assemblies 241a and 241b are brought into contact with and separated from the spring terminals 264a and 264b at the identical positions of contact surfaces. The long-time use of the battery pack 210 accordingly damages the contact surfaces and may consequently cause a defective contact.

SUMMARY OF THE INVENTION

The object of the present invention is thus to provide a simple attachment structure which ensures favorable connection of a battery pack with a battery holder in a power-driven tool over a long time period without causing any defective contact.

The above and the other related objects are realized by a first attachment structure to make a battery pack including a plurality of secondary cells detachably attached to a battery holder in a power-driven tool and realize electrical connection of the battery pack with the battery holder of the power-driven tool. The first attachment structure of the invention includes an insertion slot formed in a connection surface of the battery pack, the insertion slot having a predetermined width and defining at least one contact surface, and a connection terminal projected from the battery holder and arranged at a position corresponding to the insertion slot, wherein the connection terminal is inserted into the insertion slot to make the battery pack electrically connect with the battery holder.

In accordance with one preferred application, the connection terminal includes an insertion element having a width a little greater than the predetermined width of the insertion slot, the insertion element of the connection terminal being spread in at least two opposed directions when inserted into the insertion slot and thereby being pressed against the at least one contact surface of the insertion slot.

In accordance with another preferred application, the attachment structure further includes a pair of the connection terminals, a pair of the insertion slots, and a pair of first electrode terminal assemblies set in the respective insertion slots, the connection terminals being inserted into the insertion slots to come into contact with the first electrode terminal assemblies set in the insertion slots.

In this structure, the attachment structure may further include a pair of side slots formed in side walls of the battery pack connecting with the connection surface, each side slot being connected with the corresponding insertion slot, and a pair of second electrode terminal assemblies set in the respective side slots.

One of the first electrode terminal assemblies set in one of the insertion slots and one of the second electrode terminal assemblies set in the corresponding side slot connecting with one insertion slot form an identical first pole, that is, a positive pole. The other of the first electrode terminal assemblies set in the other of the insertion slots and the other of the second electrode terminal assemblies set in the corresponding side slot connecting with the other insertion slot form an identical second pole, that is, a negative pole.

In accordance with one preferred embodiment, the connection terminal includes two strips of electric conductive plate, which are joined together on first ends thereof and bent symmetrically on second ends thereof to form the insertion element. The two strips of electric conductive plate may be bent outward on the second ends thereof to be apart from each other. Alternatively, the two strips of electric conductive plate may be bent inward on the second ends thereof to be close to each other.

In accordance with another preferred embodiment, the connection terminal includes one strip of electric conductive plate which is folded on a substantial center thereof, free ends of the electric conductive strip being bent either inward or outward to form the insertion element.

In accordance with still another preferred embodiment, the connection terminal includes one strip of electric conductive plate which is bent inward or outward to form an U-shaped insertion element.

In one preferred structure, the attachment structure is further provided with a projection formed along the connection terminal to prevent deformation of the connection terminal.

In another preferred structure, the attachment structure is further provided with a spacer member interposed between the battery holder and the battery pack when the battery pack is attached to the battery holder. The spacer member ensures the secure connection of the battery pack with the battery holder even when a shock or vibration is applied to the attachment structure, thereby preventing the defective contact.

The present invention is also directed to a second attachment structure to make a battery pack including a plurality of secondary cells detachably attached to a battery holder in a power-driven tool and realize electrical connection of the battery pack with the battery holder of the power-driven tool. The second attachment structure of the invention includes a connection terminal projected from a terminal base formed on the battery holder, an electrode terminal assembly disposed on the battery pack, the electrode terminal assembly being electrically connected with the connection terminal, and a spacer member interposed between the terminal base of the battery holder and the battery pack when the battery pack is attached to the battery holder.

The spacer member may be integrally formed with the terminal base.

The present invention is further directed to a third attachment structure to make a battery pack including a plurality of secondary cells detachably attached to a battery holder in a power-driven tool and realize electrical connection of the battery pack with the battery holder of the power-driven tool. The third attachment structure of the invention includes an insertion slot formed in a connection surface of the battery pack, the insertion slot having an inner wall, an electrode terminal assembly set on the inner wall of the insertion slot, and a connection terminal for clamping the electrode terminal assembly fitted in the Insertion slot.

In accordance with one application, the present invention pertains to a fourth attachment structure to make a battery pack including a plurality of secondary cells detachably attached to a battery holder in a power-driven tool and realize electrical connection of the battery pack with the battery holder of the power-driven tool. The fourth attachment structure of the invention includes a pair of insertion slots formed in a connection surface of the battery pack, each insertion slot having an inner wall, a pair of side slots formed in side walls of the battery pack connecting with the connection surface, each side slot being connected with the corresponding insertion slot, a positive electrode terminal assembly having a first surface and a second surface, the first surface of the positive electrode terminal assembly being set on the inner wall of one of the insertion slots while the second surface of the positive electrode terminal assembly being set on the corresponding side slot connecting with one insertion slot, a negative electrode terminal assembly having a first surface and a second surface, the first surface of the negative electrode terminal assembly being set on the inner wall of the other of the insertion slots while the second surface of the negative electrode terminal assembly being set on the corresponding side slot connecting with the other insertion slots, and first and second connection terminals projected from the battery holder, each connection terminal having a clamping element on one end thereof, the clamping element of the first connection terminal clamping the first surface and the second surface of the positive electrode terminal assembly, and the clamping element of the second connection terminal clamping the first surface and the second surface of the negative electrode terminal assembly.

In one preferred structure, each connection terminal includes two strips of electric conductive plate, which are joined together on first ends thereof and bent symmetrically on second ends thereof to form the clamping element. The connection terminal may further include a reinforcement member formed along each strip of electric conductive plate. The reinforcement member effectively enhances the clamping force of the connection terminal.

In accordance with one preferred embodiment, the attachment structure is further provided with a spacer member interposed between the battery holder and the battery pack when the battery pack is attached to the battery holder.

The present invention is also directed to a fifth attachment structure to make a battery pack including a plurality of secondary cells detachably attached to a battery holder in a power-driven tool and realize electrical connection of the battery pack with the battery holder of the power-driven tool. The fifth attachment structure of the invention includes first and second insertion slots formed in a connection surface of the battery pack, each insertion slot having an inner wall, first and second side slots formed in side walls of the battery pack connecting with the connection surface, each side slot being connected with the corresponding insertion slot, a positive electrode terminal assembly having a first surface and a second surface, the first surface of the positive electrode terminal assembly being set on the inner wall of the first insertion slot while the second surface of the positive electrode terminal assembly being set on the first side slot connecting with the first insertion slot, a negative electrode terminal assembly having a first surface and a second surface, the first surface of the negative electrode terminal assembly being set on the inner wall of the second insertion slot while the second surface of the negative electrode terminal assembly being set on the second side slot connecting with the second insertion slot, and first and second connection terminals projected from the battery holder, each connection terminal having an insertion element on one end thereof, the insertion element of the first connection terminal being inserted into the first insertion slot to be electrically connected with the positive electrode terminal assembly, and the insertion element of the second connection terminal being inserted into the second insertion slot to be electrically connected with the negative electrode terminal assembly.

In any of the above attachment structures is sufficiently simple and enables the battery pack to be securely attached to the battery holder of the power-driven tool via a greater contact area. The structure of the invention can effectively prevent an increase in contact resistance and thereby undesirable chattering in vibrating tools. The battery pack can thus supply electricity to the power-driven tool under a stable condition without shortening the life of the secondary batteries included in the battery pack.

These and other objects, features, aspects, and advantages of the present invention will become more apparent from the following detailed description of the preferred embodiments with the accompanying drawings.

DESCRIPTION OF THE PREFERRED EMBODIMENT

Figure 1:
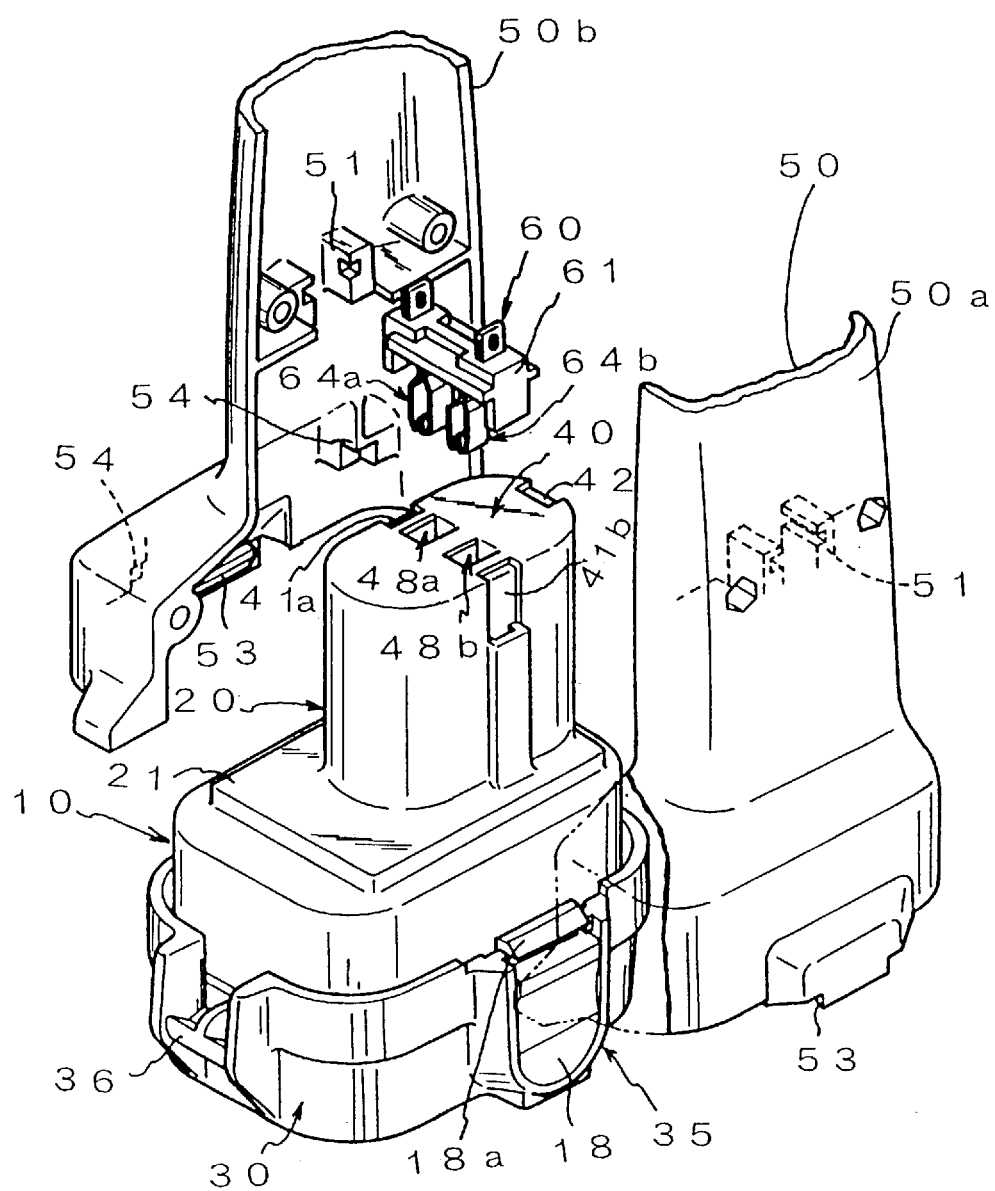
FIG. 1 is a perspective view illustrating a battery pack 10 and a handle assembly 50 of a power-driven tool embodying the attachment structure of the present invention.

A first embodiment of the present invention is described with the accompanying drawings. FIG. 1 is a perspective view illustrating a battery pack 10 and a handle assembly 50 of a power-driven tool embodying the attachment structure of the present invention; and FIG. 2 is a decomposed perspective view illustrating details of the attachment structure of the first embodiment.

Referring to FIG. 1, the battery pack 10 includes an upper battery case 20, a lower battery case 30, and a plurality of secondary cells 1 (see FIG. 2) received in the upper battery case 20 and the lower battery case 30. The upper battery case 20 receives two secondary cells 1, and the lower battery case 30 six secondary cells 1. The total capacity of the secondary cells 1 is 9.6 V in this embodiment. The upper and the lower battery cases 20 and 30 are composed of a synthetic resin and are integrally welded to each other.

The battery pack 10 has a connection unit 40, which includes a pair of electrode terminal assemblies 41a and 41b and a thermo-terminal assembly 42, on its upper end portion, that is, on the upper battery case 20. The electrode terminal assemblies 41a and 41b are respectively connected to positive and negative terminals (not shown) of the secondary cells 1. The thermo-terminal assembly 42 is connected with a thermostat (not shown) incorporated in the battery pack 10. The battery pack 10 is further provided on its lower end portion, that is, on the lower battery case 30, with a pair of attachment members 35 and an engagement member 36. The pair of attachment members 35 are fitted into the lower ends of the handle assembly 50 of the power-driven tool (not fully shown), which includes a pair of split housing members 50a and 50b. Each attachment member 35 is further provided with a stop hook 18 as described below. The engagement member 36 of the battery pack 10 can be engaged with a set plate 77 (see FIG. 4) of the handle assembly 50.

Figure 2:
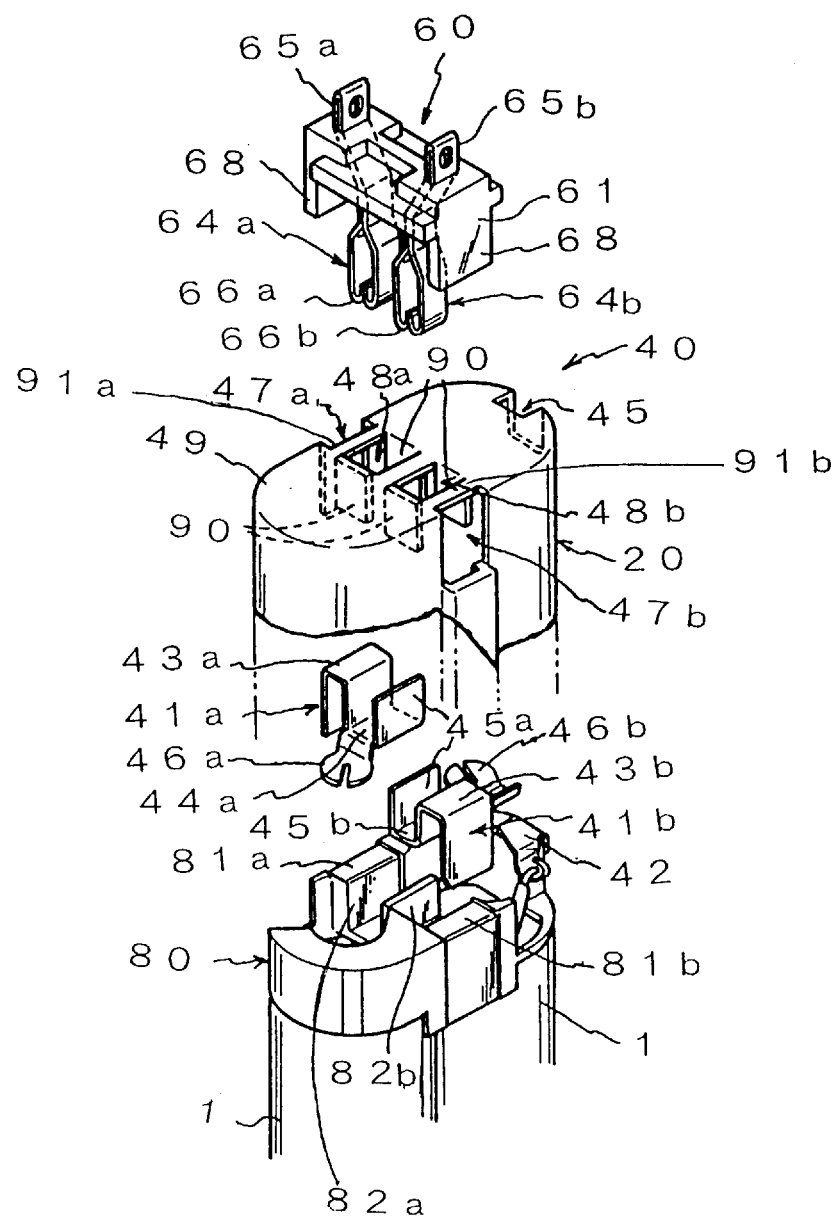
FIG. 2 is a decomposed perspective view illustrating details of the attachment structure of the first embodiment.

Referring to FIG. 2, the connection unit 40 has a pair of side slots 47a and 47b, which are formed on either ends of the width of a connection surface 49 arranged as a top face of the upper battery case 20. A pair of insertion slots 48a and 48b are also formed in the connection surface 49 of the upper battery case 20. Each insertion slot 44a (48b) connects with the side slot 47a (47b). The connection unit 40 further includes a vertical notch 45 formed on one end of the length of the connection surface 49. A pair of dust-proof pieces 90 extend perpendicularly to the connection surface 49 in order to cover the opposed faces of each insertion slot 48a (48b) other than the faces through which the electrode terminal assembly 41a (41b) is exposed. The dust-proof pieces 90 protect the insertion slots 48a and 48b from dust.

The positive electrode terminal assembly 41a and the negative electrode terminal assembly 41b are supported on a terminal holder 80 arranged above the secondary cells 1 accommodated in the upper battery case 20. Each electrode terminal assembly 41a (41b) is set in the side slot 47a (47b) and the insertion slot 48a (48b) to be exposed on the two side faces thereof. The thermo-terminal assembly 42 is set in the vertical notch 45 to be exposed on the side face thereof. Each electrode terminal assembly 41a (41b) is made of an electric conductive plate and includes an U-shaped element 43a (43b), a horizontal element 44a (44b), an upright element 45a (45b), and a contact element 46a (46b) which is brought into contact with the secondary cell 1 The U-shaped elements 43a and 43b respectively cover side wall elements 81a and 81b disposed on either ends of the width of the terminal holder 80. The upright elements 45a and 45b are set along insulating wall elements 82a and 82b projected on the center of the terminal holder 80. Each electrode terminal assembly 41a (41b) accordingly has two contact surfaces, one with the side wall element 81a (81b) and the other with the insulating wall element 82a (82b) of the terminal holder 80.

There are bridges 91a and 91b formed between the side slots 47a,47b and the insertion slots 48a,48b on the connection surface 49. The bridges 91a and 91b prevent the upper surfaces of the electrode terminal assemblies 41a and 41b from being fully exposed, thereby effectively preventing a short circuit between the electrode terminal assemblies 41a and 41b.

Referring to both FIGS. 1 and 2, the battery pack 10 thus constructed is attached to a battery holder 60 in the power-driven tool. The battery holder 60 includes a terminal base 61 which is made of a synthetic resin and held by a pair of seat elements 51 formed on the respective split housing members 50a and 50b. A positive spring terminal 64a and a negative spring terminal 64b are integrally joined with and supported by the terminal base 61. The spring terminals 64a and 64b are inserted into the insertion slots 48a and 48b of the battery pack 10 to be electrically connected with the electrode terminal assemblies 41a and 41b, respectively.

Each spring terminal 64a (64b) is prepared by folding a strip of electric conductive plate 65a (65b) on the substantial center thereof. The fold of each folded electric conductive plate 65a (65b) is projected upward from the terminal base 61 to be connected with a lead wire (not shown) of the power-driven tool. Each folded electric conductive plate 65a (65b) has free ends formed as a symmetrical insertion element 66a (66b) projected downward from the terminal base 61. The free ends of the insertion element 66a (66b) are bent outward to be apart from each other by a predetermined distance. The predetermined distance is a little greater than the width of each insertion slot 48a (48b). The extreme ends of the insertion element 66a (66b) are curved inward to face each other. This structure enables the spring terminals 64a and 64b to be easily fitted into the insertion slots 48a and 48b. The spring terminals 64a and 64b have elasticity in the folding direction of the electric conductive plates 65a and 65b. A pair of spacers 68 are extended from the terminal base 61 to be arranged in parallel to the insertion elements 66a and 66b.

Figure 3:
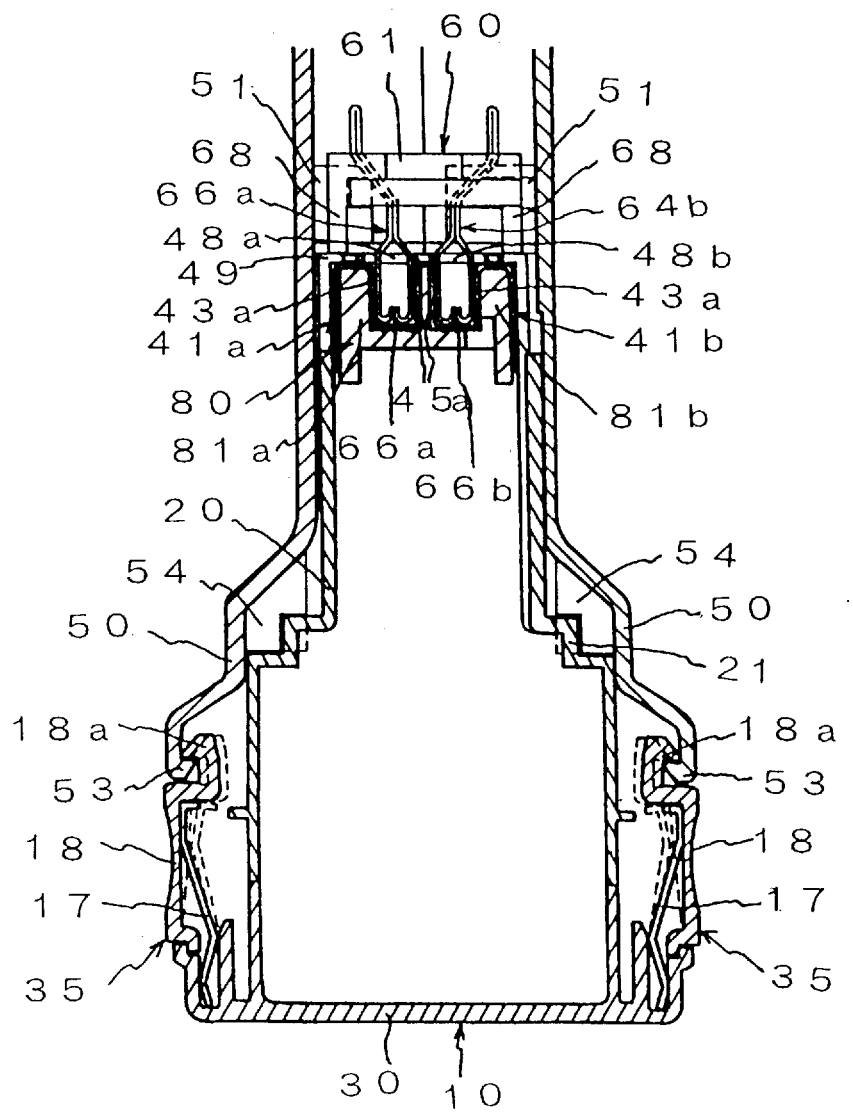
FIG. 3 is a cross sectional view illustrating the attachment structure of the first embodiment.
Figure 4:
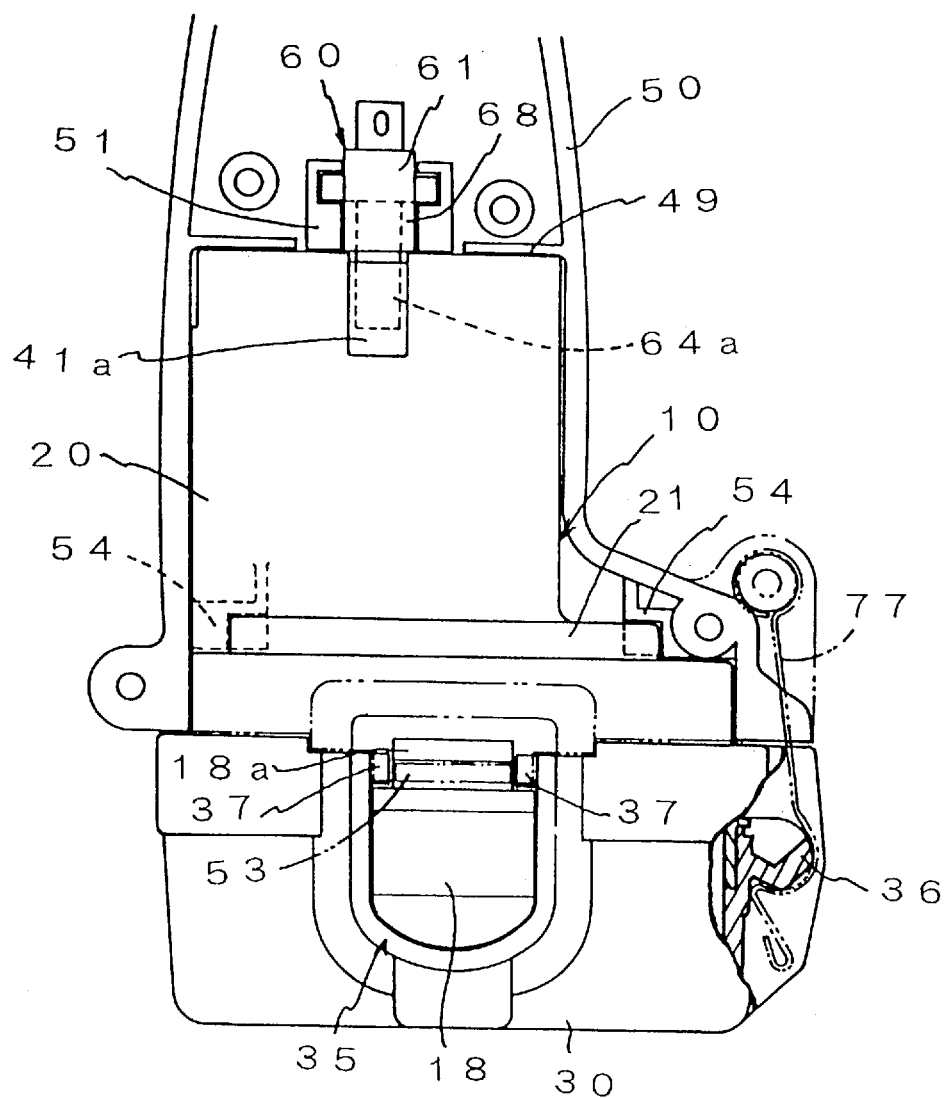
FIG. 4 is a partially omitted side view illustrating the attachment structure of the first embodiment.

FIG. 3 is a cross sectional view illustrating the attachment structure of the first embodiment; and FIG. 4 is a partially omitted side view illustrating the attachment structure of the first embodiment. When the battery pack 10 is inserted upward into the battery holder 60 fixed to the handle assembly 50 of the power-driven tool, the pair of stop hooks 18 formed on the lower end of the battery pack 10 are engaged with curved elements 53 of the housing members 50a and 50b. The curved element 53 is formed by bending inward the lower end of each housing member 50a (50b). Each stop hook 18 arranged in the attachment member 35 is pressed outward by a flat spring 17 and has a hook end 18a held by a pair of projections 37 as clearly shown in FIG. 4. Once the stop hooks 18 of the battery pack 10 are engaged with the curved elements 53 of the handle assembly 50, the engagement is kept by the pressing force of the flat springs 17.

In this state, the spring terminals 64a and 64b of the battery holder 60 are fitted in the insertion slots 48a and 48b of the connection unit 40. Each insertion element 66a (66b) of the spring terminal 64a (64b) is pressed inward and received in the space defined by the inner wall of the U-shaped element 43a and the upright element 45a of the electrode terminal assembly 41a (41b). The elasticity of the spring terminals 64a and 64b presses the insertion elements 66a and 66b thereof against the electrode terminal assemblies 41a and 41b. This realizes electrical connection of the spring terminals 64a and 64b with the electrode terminal assemblies 41a and 41b and enables the battery pack 10 to be integrally joined with the battery holder 60 of the power-driven tool.

The spacers 68 extending from the terminal base 61 are brought into contact with the connection surface 49 of the upper battery case 20 to prevent the battery holder 60 from being rattled. This structure further ensures the secure connection of the battery pack 10 with the battery holder 60 and effectively prevents chattering even in vibrating tools.

As described previously, each electrode terminal assembly 41a (41b) has two contact surfaces, one with the side wall element 81a (81b) and the other with the insulating wall element 82a (82b) of the terminal holder 80. This increases the contact area and favorably reduces the adverse effect of contact resistance even in vibrating tools with a large loading, such as vibrating drills. These favorable effects are attained by the simple structure of the spring terminals 64a and 64b each formed from a strip of electric conductive plate and of the electrode terminal assemblies 41a and 41b each with two contact surfaces. Such simple structure does not increase the manufacturing cost.

The upper battery case 20 of the battery pack 10 has a stepped portion 21. When the battery pack 10 is attached to the battery holder 60 fixed to the handle assembly 50, four corners of the stepped portion 21 are received by the corresponding notched portions 54 formed on the inner wall of the housing members 50a and 50b. This structure further ensures the secure attachment of the battery pack 10 to the power-driven tool.

As described previously, the battery pack 10 of the first embodiment includes the engagement member 36 disposed on the lower battery case 30. When the handle assembly 50 is provided with the set plate 77 as shown in FIG. 4, the set plate 77 may be used instead of the stop hooks 18 for the attachment of the battery pack 10.

Figure 14:
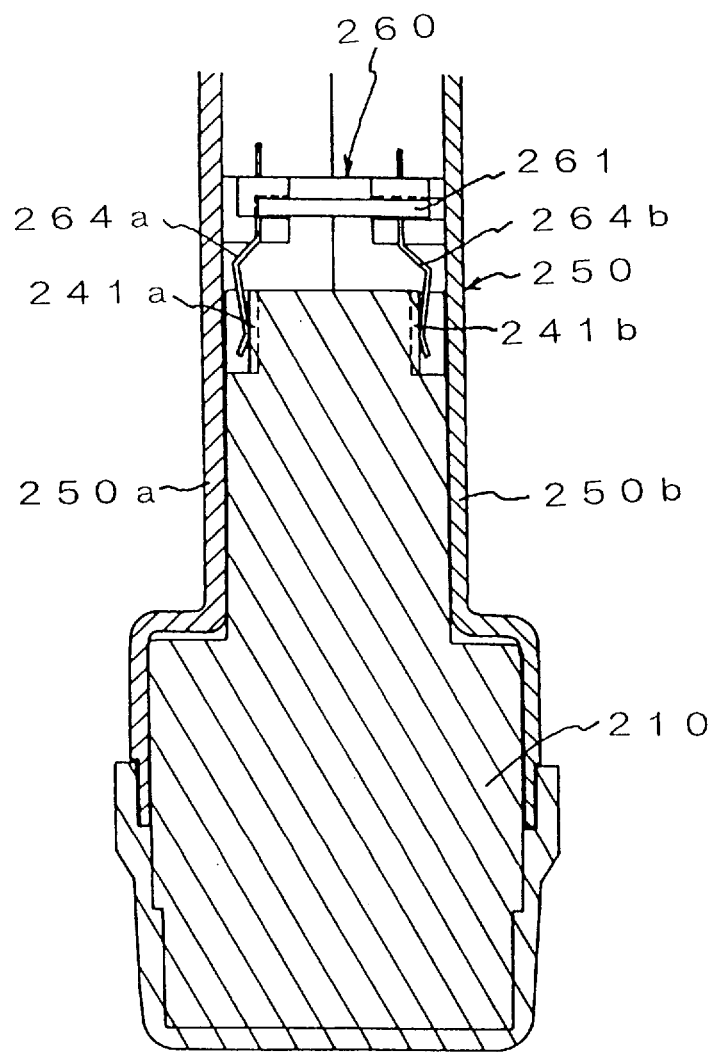
FIG. 14 is a cross sectional view illustrating a conventional attachment structure to make a battery pack connected with a battery holder in a power-driven tool.

The battery pack 10 of the first embodiment has the side slots 47a and 47b as well as the insertion slots 48a and 48b, which receive the insertion elements 66a and 66b of the spring terminals 64a and 64b. The side slots 47a and 47b allow the electrode terminal assemblies 41a and 41b to be exposed on the side faces thereof. This enables the battery pack 10 of the embodiment to be connected with the conventional power-driven tool having the non-folded spring terminals 264a and 264b as illustrated in FIG. 14. The battery pack 10 can be connected with the conventional battery holder 260 (see FIG. 14) as well as with the battery holder 60 of the embodiment. The electrode terminal assemblies 41a and 41b accordingly come into contact with the spring terminals 64a and 64b of the embodiment on one contact surface and with the conventional spring terminals 264a and 264b on the other contact surface. This effectively protects the contact surfaces of the electrode terminal assemblies 41a and 41b from damage and depresses the increase in contact resistance.

The battery holder 10 of the first embodiment includes the six secondary cells 1 having the total capacity of 9.6 V. The battery holder may, however, be modified to include any number of secondary cells received in any desired shape of battery cases.

Although the spring terminals 64a and 64b are integrally joined with the terminal base 61 of the battery holder 60 in the above embodiment, the spring terminals may be extended from a switch of the power-driven tool. In this modified structure, the switch is integrally joined with the battery holder.

In the above embodiment, each folded electric conductive plate 65a (65b) has free ends formed as the insertion element 66a (66b) of the spring terminal 64a (64b). The ends of each folded electric conductive plate 65a (65b) may, however, be joined with each other as long as sufficient elasticity can be given to the spring terminal 64a (64b). The insertion elements 66a and 66b may have any different shape, for example, an elliptic shape or a cylindrical shape with a slit in the axial direction. The extreme ends of the insertion element 66a (66b) may be curved outward to be apart from each other, although they are curved inward to face each other in the above embodiment.

Some examples of possible modification for the spring terminals are given below. Like numerals denote like elements, which are not described here.

Figure 5:
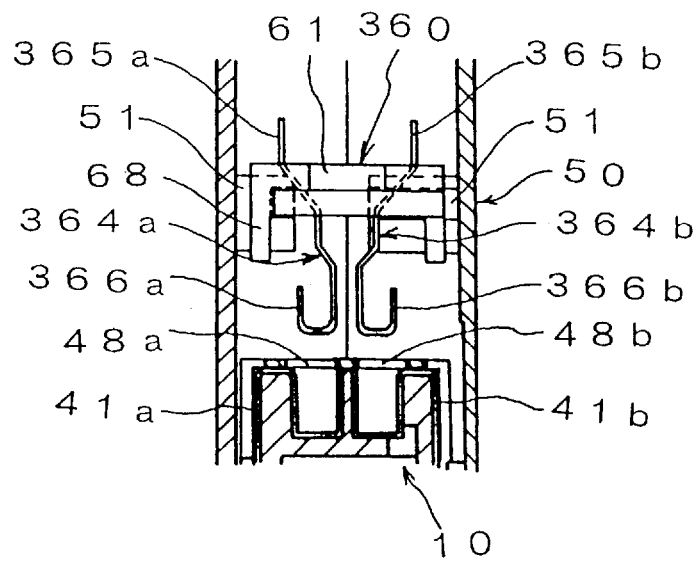
FIG. 5 is a cross sectional view illustrating another battery holder 360 as a modification of the first embodiment.

In a battery holder 360 having a modified structure of FIG. 5, positive and negative spring terminals 364a and 364b are formed symmetrically to have free ends thereof curved outward. Each spring terminal 364a (364b) is prepared by bending one strip of electric conductive plate 365a (365b) toward the axial center of the handle assembly 50 below the terminal base 61 and then curving the free end of the electric conductive plate 365a (365b) outward to form a U-shaped insertion element 366a (366b). The U-shaped insertion element 366a (366b) is formed to have a width a little greater than that of the insertion slot 48a (48b). When the insertion elements 366a and 366b of the spring terminals 364a and 364b are inserted into the insertion slots 48a and 48b, the elasticity of the spring terminals 364a and 364b presses the insertion elements 366a and 366b thereof against the electrode terminal assemblies 41a and 41b. This realizes electrical connection of the spring terminals 364a and 364b with the electrode terminal assemblies 41a and 41b and enables the battery pack 10 to be integrally joined with the battery holder 360 of the power-driven tool.

Like another modified structure shown in FIG. 6, positive and negative spring terminals 464a and 464b may be formed without the portions bent toward the axial center of the handle assembly 50 below the terminal base 61. In this structure, each spring terminal 464a (464b) is prepared by making one strip of electric conductive plate 465a (465b) run straight below the terminal base 61 and curving the free end of the electric conductive strip 465a (465b) outward to form a U-shaped insertion element 466a (466b). The U-shaped insertion element 466a (466b) is formed to have a width a little greater than that of the insertion slot 48a (48b). When the insertion elements 466a and 466b of the spring terminals 464a and 464b are inserted into the insertion slots 48a and 48b, the elasticity of the spring terminals 464a and 464b presses the insertion elements 466a and 466b thereof against the electrode terminal assemblies 41a and 41b. This realizes electrical connection of the spring terminals 464a and 464b with the electrode terminal assemblies 41a and 41b and enables the battery pack 10 to be integrally joined with a battery holder 460 of the power-driven tool.

Figure 6:
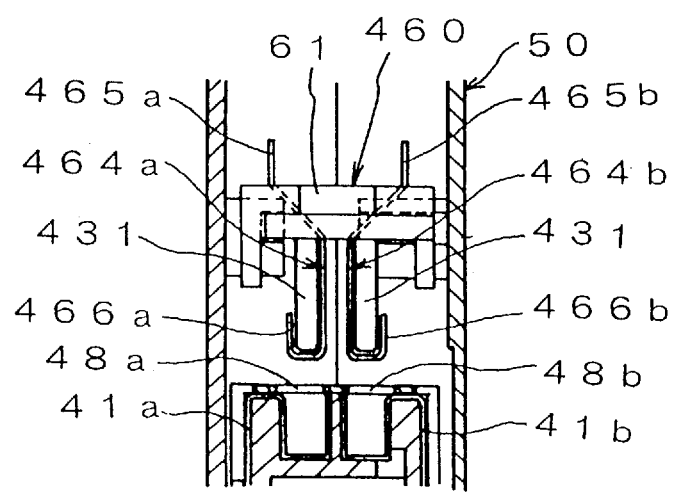
FIG. 6 is a cross sectional view illustrating still another battery holder 460 as another modification of the first embodiment.

In the modified structure of FIG. 6, a pair of projections 431 are extended downward from the terminal base 61 to be formed along the straight portions of the spring terminals 464a and 464b and fitted in the U-shaped insertion elements thereof 466a and 466b. When a wrong battery pack is inserted into the handle assembly 50, these projections 431 protect the spring terminals 464a and 464b from undesirable deformation or unintentional contact. These projections 431 also prevent the decrease in elasticity of the spring terminals 464a and 464b.

Figure 7:
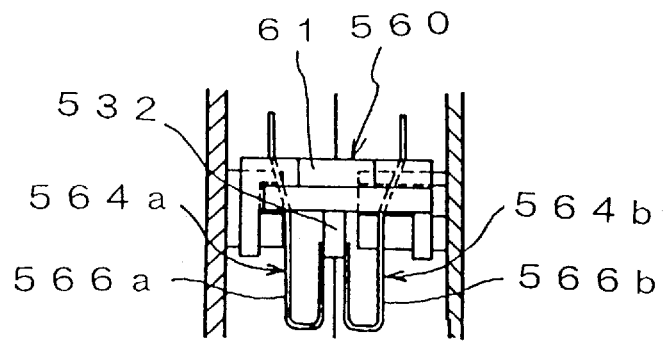
FIG. 7 is a cross sectional view illustrating another battery holder 560 as still another modification of the first embodiment.

Like still another modified structure shown in FIG. 7, positive and negative spring terminals 564a and 564b may be formed symmetrically to have free ends thereof curved inward. In this structure, the free end of each spring terminal 564a (564b) is curved inward to form a U-shaped insertion element 566a (566b), whose width is a little greater than that of the insertion slot 48a (48b). When the insertion elements 566a and 566b of the spring terminals 564a and 564b are inserted into the insertion slots 48a and 48b, the elasticity of the spring terminals 564a and 564b presses the insertion elements 566a and 566b thereof against the electrode terminal assemblies 41a and 41b. This realizes electrical connection of the spring terminals 564a and 564b with the electrode terminal assemblies 41a and 41b and enables the battery pack 10 to be integrally joiner with a battery holder 560 of the power-driven tool. In the structure of FIG. 7, a projection 532 is extended downward from the substantial center of the terminal base 61 to be formed along the free ends of the U-shaped insertion elements 566a and 566b. The projection 532 effectively protects the spring terminals 564a and 564b from a short circuit.

Figure 8:
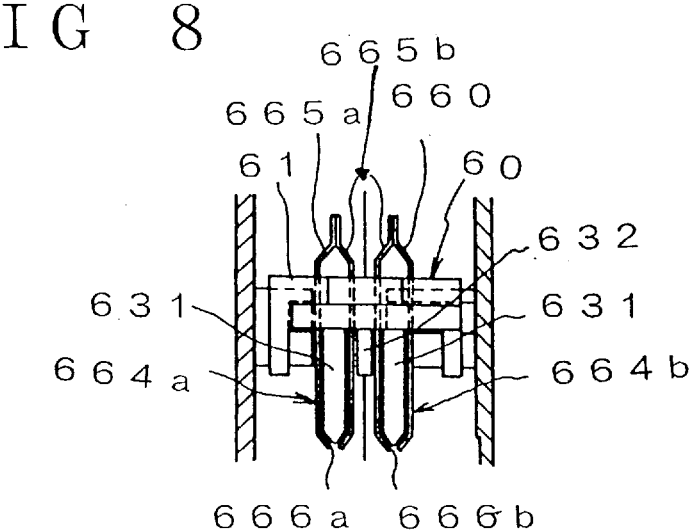
FIG. 8 is a cross sectional view illustrating still another battery holder 660 as another modification of the first embodiment.

FIG. 8 is a cross sectional view illustrating another battery holder 660 having still another modified structure. Each spring terminal 664a (664b) consists of two strips of electric conductive plate 665A and 665B. Each pair of strips of electric conductive plate 665A and 665B run through the terminal base 61 to be arranged in parallel with each other. The free ends of each pair of electric conductive strips 665A and 665B are curved inward to form a tapered insertion element 666a (666b). The space between the two electric conductive strips 665A and 665B arranged in parallel with each other is a little greater than that of the insertion slot 48a (48b). When the spring terminals 664a and 664b are inserted into the insertion slots 48a and 48b, the elasticity of the spring terminals 664a and 664b allows the spring terminals 664a and 664b to be pressed against the electrode terminal assemblies 41a and 41b. This realizes electrical connection of the spring terminals 664a and 664b with the electrode terminal assemblies 41a and 41b and enables the battery pack 10 to be integrally joined with the battery holder 660 of the power-driven tool.

In the modified structure of FIG. 8, a pair of projections 631 are extended downward from the terminal base 61 to be fitted in the space defined by the two electric conductive strips 665A and 665B arranged in parallel with each other. These projections 631 protect the spring terminals 664a and 664b from undesirable deformation or unintentional contact. Another projection 632 is extended downward from the substantial center of the terminal base 61 to be interposed between the two spring terminals 664a and 664b. The projection 632 effectively protects the spring terminals 664a and 664b from a short circuit.

Figure 9:
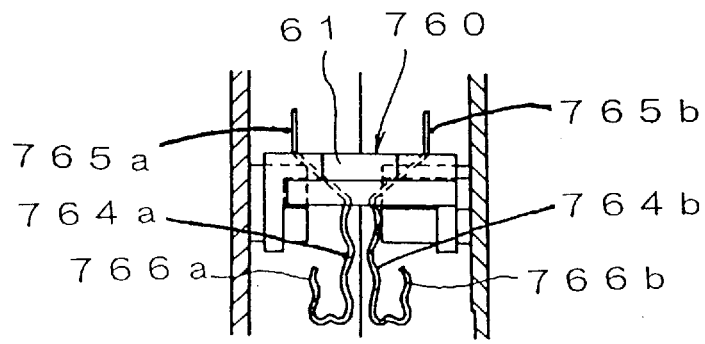
FIG. 9 is a cross sectional view illustrating another battery holder 760 as still another modification of the first embodiment.

FIG. 9 shows still another battery holder 760 with corrugated spring terminals 764a and 764b. Each spring terminal 764a (764b) is prepared by curving a corrugated strip of electric conductive plate 765a (765b) in the same manner as the structure of FIG. 6. The spring terminal 764a (764b) has a U-shaped insertion element 766a (766b) whose width is a little greater than that of the insertion slot 48a (48b). The corrugated plate allows the spring terminals 764a and 764b to be unintentionally bent to some extent and ensures a stable contact of the spring terminals 764a and 764b with the electrode terminal assemblies 41a and 41b. This enhances the reliability of electrical connection of the spring terminals 764a and 764b with the electrode terminal assemblies 41a and 41b.

In any of the above modified structure, each spring terminal may include plural strips of electric conductive plate.

Figure 10:
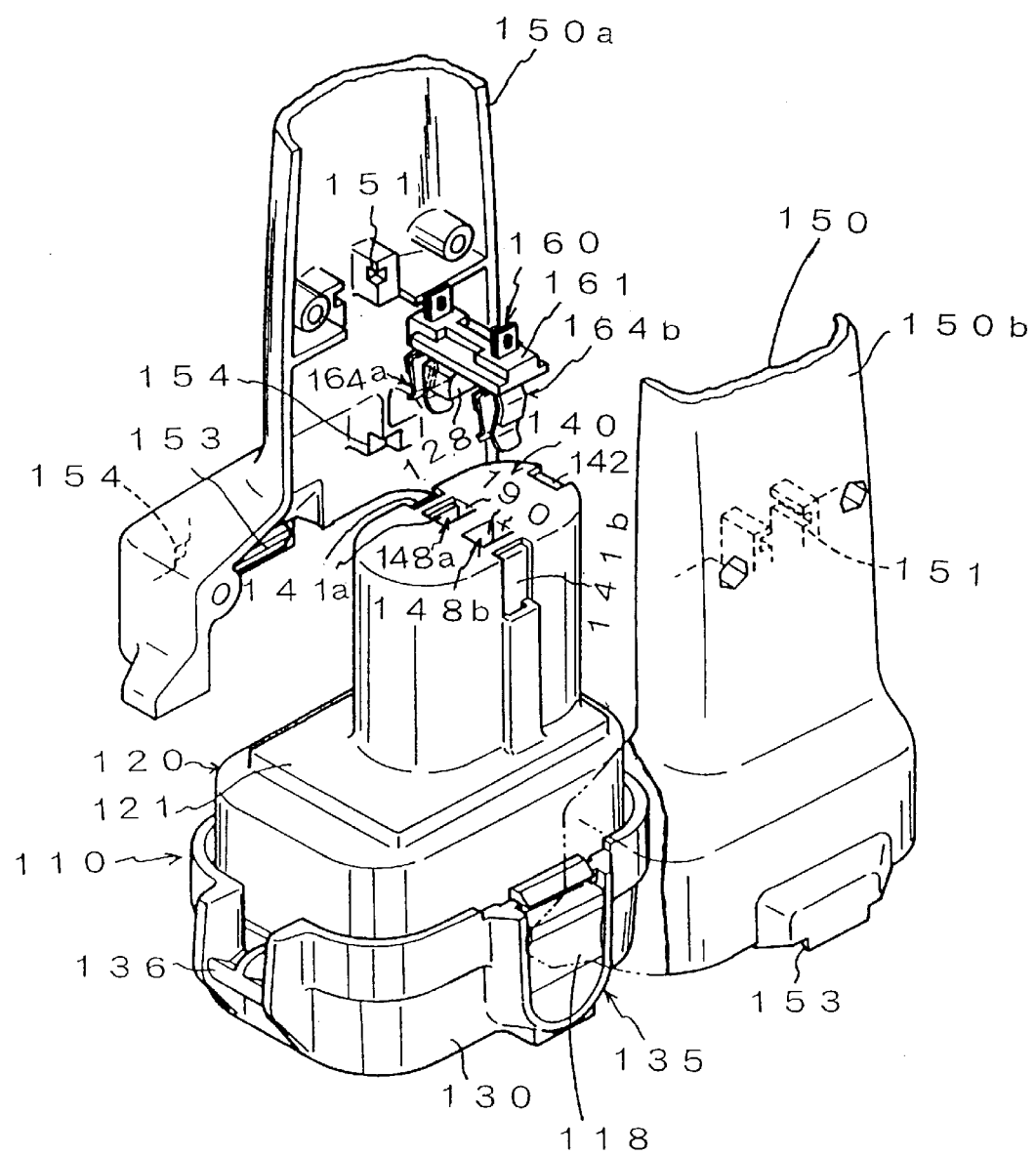
FIG. 10 is a perspective view illustrating a battery pack 110 and a handle assembly 150 of a power-driven tool as a second embodiment according to the present invention.

A second embodiment of the present invention is described with the accompanying drawings. FIG. 10 is a perspective view illustrating a battery pack 110 and a handle assembly 150 of a power-driven tool as the second embodiment according to the present invention; and FIG. 11 is a decomposed perspective view illustrating details of the attachment structure of the second embodiment.

Referring to FIG. 10, the battery pack 110 includes an upper battery case 120, a lower battery case 130, and a plurality of secondary cells 101 (see FIG. 11) received in the upper battery case 120 and the lower battery case 130. The upper battery case 120 receives two secondary cells 101, and the lower battery case 130 six secondary cells 101. The total capacity of the secondary cells 101 is 9.6 V in this embodiment. The upper and the lower battery cases 120 and 130 are composed of a synthetic resin and are integrally welded to each other or joined with each other by means of screws.

The battery pack 110 has a connection unit 140, which includes a pair of electrode terminal assemblies 141a and 141b and a thermo-terminal assembly 142, on its upper end portion, that is, on the upper battery case 120. The electrode terminal assemblies 141a and 141b are respectively connected to positive and negative terminals (not shown) of the secondary cells 101. The thermo-terminal assembly 142 is connected with a thermostat (not shown) incorporated in the battery pack 110. The battery pack 110 is further provided on its lower end portion, that is, on the lower battery case 130, with a pair of attachment members 135 and an engagement member 136. The pair of attachment members 135 are fitted into the lower ends of the handle assembly 150 of the power-driven tool (not fully shown), which includes a pair of split housing members 150a and 150b. Each attachment member 135 is further provided with a stop hook 118 as described later. The engagement member 136 of the battery pack 110 can be engaged with a set plate 177 (see FIG. 13) of the handle assembly 150.

Figure 11:
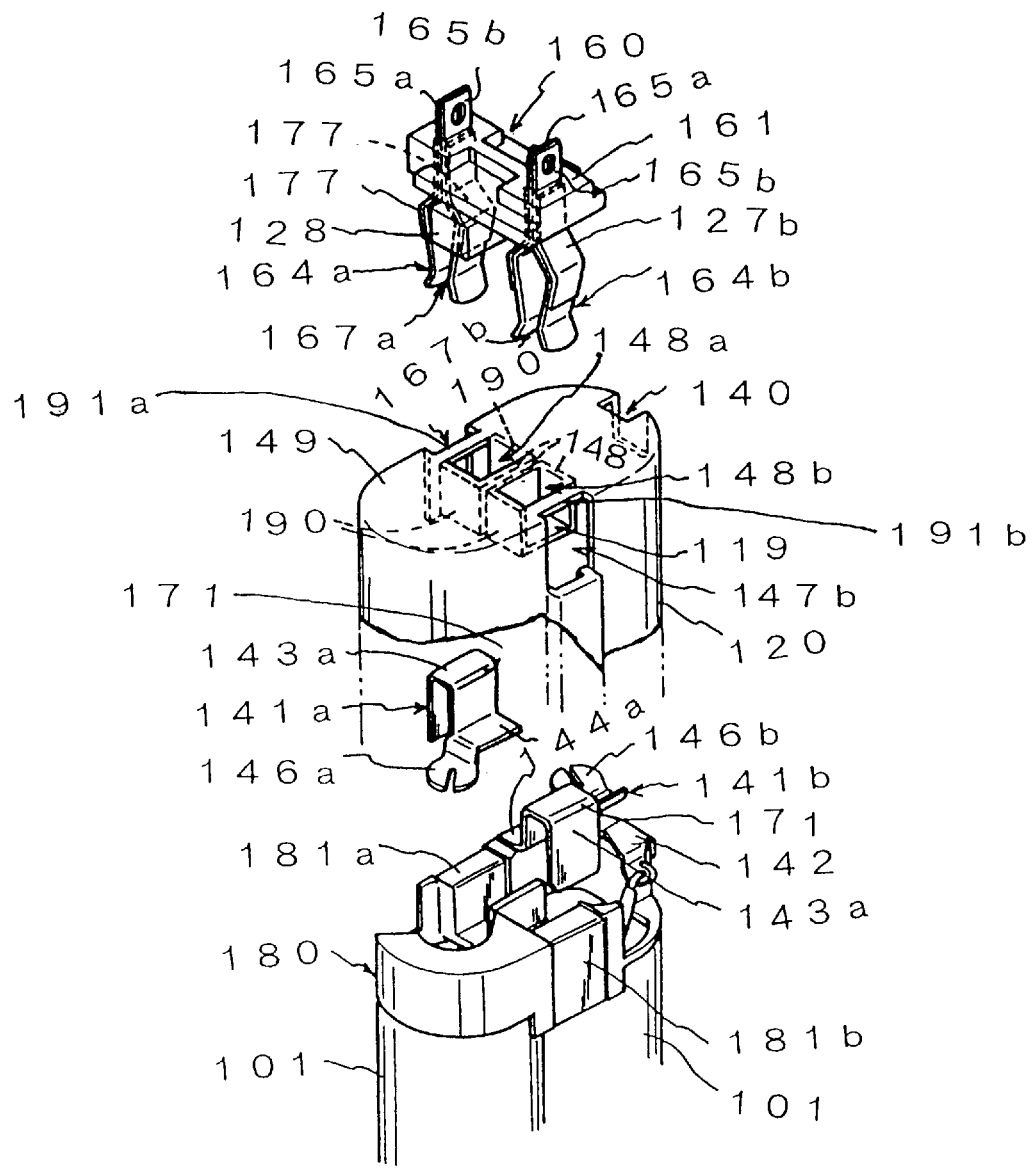
FIG. 11 is a decomposed perspective view illustrating details of the attachment structure of the second embodiment.

Referring to FIG. 11, the connection unit 140 has a pair of side slots 147a and 147b, which are formed on either ends of the width of a connection surface 149 arranged as a top face of the upper battery case 120. A pair of insertion slots 148a and 148b are also formed in the connection surface 149 of the upper battery case 120. Each insertion slot 148a (148b) connects with the side slot 147a (147b). The connection unit 140 further Includes a vertical notch 145 formed on one end of the length of the connection surface 149. Three dust-proof pieces 190 extend perpendicularly to the connection surface 149 in order to cover three faces of each insertion slot 148a (148b) other than the face through which the electrode terminal assembly 141a (141b) is exposed. A bottom plate 119 is formed in the insertion slot 148a (148b) to be integrally joined with the three dust-proof pieces 190. The dust-proof pieces 190 and the bottom plate 119 protect the insertion slots 148a and 148b from dust and a short circuit.

The positive electrode terminal assembly 141a and the negative electrode terminal assembly 141b are supported on a terminal holder 180 arranged above the secondary cells 101 accommodated in the upper battery case 120. Each electrode terminal assembly 141a (141b) is set in the side slot 147a (147b) and the insertion slot 148a (148b) to be exposed on the two side faces thereof. The thermo-terminal assembly 142 is set in the vertical notch 145 to be exposed on the side face thereof. Each electrode terminal assembly 141a (141b) is made of an electric conductive plate and includes an U-shaped element 143a (143b), a horizontal element 144a (144b), and a contact element 146a (146b) which is brought into contact with the secondary cell 101. The U-shaped elements 143a and 143b respectively cover side wall elements 181a and 181b disposed on either ends of the width of the terminal holder 180. Each electrode terminal assembly 141a (141b) accordingly has two exposed surfaces, one to the side slot 147a (147b) and the other to the insertion slot 148a (148b) of the connection unit 140.

There are bridges 191a and 191b formed between the side slots 147a,147b and the insertion slots 148a,148b on the connection surface 149. The bridges 191a and 191b prevent the upper surfaces of the electrode terminal assemblies 141a and 141b from being fully exposed, thereby effectively preventing a short circuit between the electrode terminal assemblies 141a and 141b.

Referring to both FIGS. 10 and 11, the battery pack 110 thus constructed is attached to a battery holder 160 in the power-driven tool. The battery holder 160 includes a terminal base 161 which is made of a synthetic resin and held by a pair of seat elements 151 formed on the respective split housing members 150a and 150b. A positive spring terminal 164a and a negative spring terminal 164b are integrally joined with and supported by the terminal base 161. Each spring terminal 164a (164b) consists of two strips of electric conductive plates 165A and 165B. The upper ends of the electric conductive strips 165A and 165B are joined together to be-protruded upward from the terminal base 161 and connected with a lead wire (not shown) of the power-driven tool. The lower ends of the electric conductive strips 165A and 165B projected downward from the terminal base 161 are bent three times: apart from the axial center of the handle assembly 150, toward the axial center, and again apart from the axial center. The extreme lower ends of the electric conductive strips 165A and 165B are thus spread to form a clamp element 167a (167b). Each electric conductive strip 165A (165B) accordingly has elasticity toward the other strip 165B (165A). A reinforcement plate 127A (127B) folded twice along the electric conductive strip 165A (165B) is placed outside of the electric conductive strip 165A (165B). A spacer block 128 is extended perpendicularly to the terminal base 161 to be arranged between the spring terminals 164a and 164b below the terminal base 161.

Figure 12:
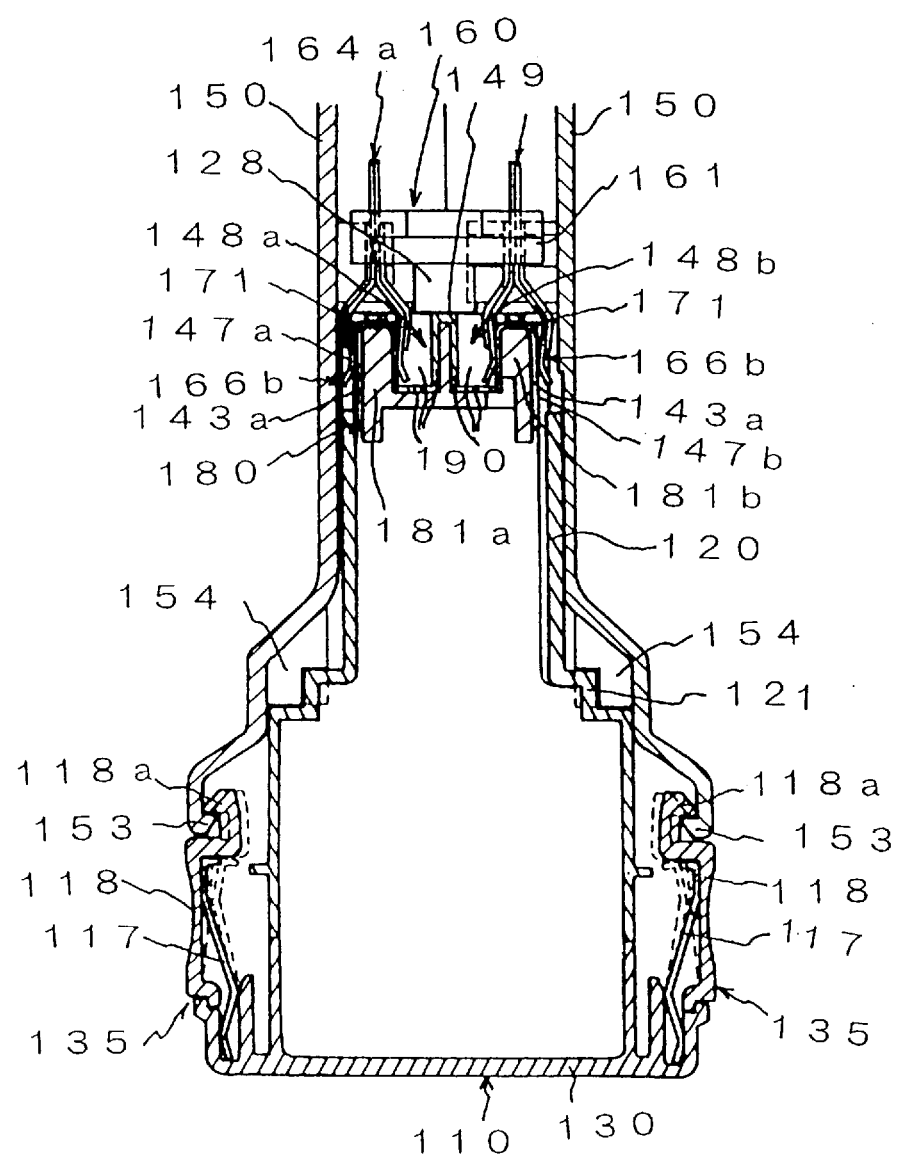
FIG. 12 is a cross sectional view illustrating the attachment structure of the second embodiment.
Figure 13:
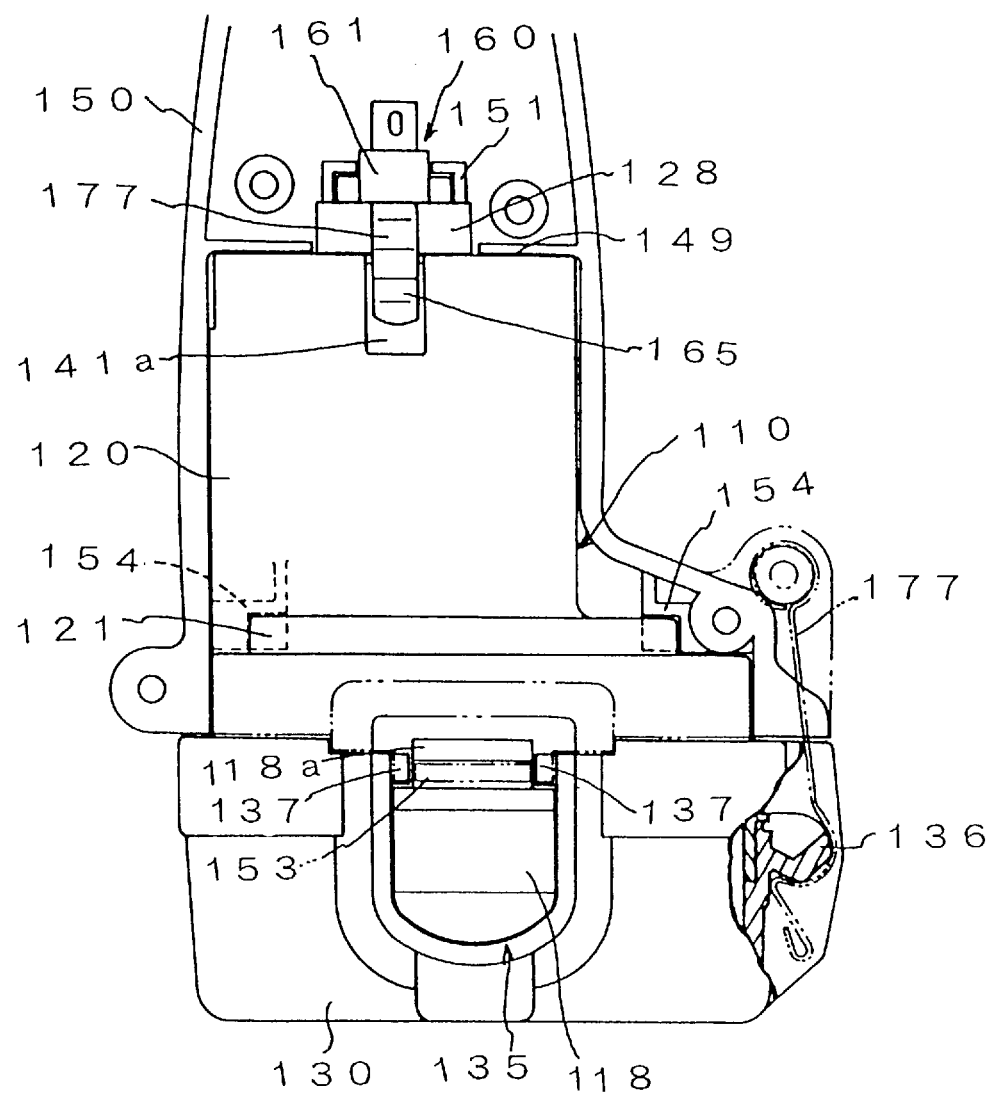
FIG. 13 is a partially omitted side view illustrating the attachment structure of the second embodiment.

FIG. 12 is a cross sectional view illustrating the attachment structure of the second embodiment; and FIG. 13 is a partially omitted side view illustrating the attachment structure of the second embodiment. When the battery pack 110 is inserted upward into the battery holder 160 fixed to the handle assembly 150 of the power-driven tool, the pair of stop hooks 118 formed on the lower end of the battery pack 110 are engaged with curved elements 153 of the housing members 150a and 150b. The curved element 153 is formed by bending inward the lower end of each housing member 150a (150b). Each stop hook 118 arranged in the attachment member 135 is pressed outward by a flat spring 117 and has a hook end 118a held by a pair of projections 137 as clearly shown in FIG. 13. Once the stop hooks 118 of the battery pack 110 are engaged with the curved elements 153 of the handle assembly 150, the engagement is kept by the pressing force of the flat springs 117.

In this state, each clamp element 167a (167b) of the spring terminal 164a (164b) clamps the U-shaped element 143a (143b) of the electrode terminal assembly 141a (141b) exposed to the two opposed faces, that is, one to the side slot 147a (147b) and the other to the insertion slot 148a (148b). The elasticity of the spring terminals 164a and 164b allows the spring terminals 164a and 164b to be pressed against the electrode terminal assemblies 141a and 141b. This realizes electrical connection of the spring terminals 164a and 164b with the electrode terminal assemblies 141a and 141b and enables the battery pack 110 to be integrally joined with the battery holder 160 of the power-driven tool.

Each U-shaped element 143a (143b) of the electrode terminal assembly 141a (141b) has chamfered faces 171 on either edges thereof. These chamfered faces 171 formed on the U-shaped elements 143a and 143b enable the clamp elements 167a and 167b of the spring terminals 164a and 164b to smoothly clamp the U-shaped elements 143a and 143b of the electrode terminal assemblies 141a and 141b.

The side wall elements 181a and 181b are integrally formed with the terminal holder 180 as thick-wall elements made of a heat-resistant synthetic resin. The thick-wall elements 181a and 181b further enhance the clamping force of the spring terminals 164a and 164b and prevent the electrode terminal assemblies 141a and 141b and the spring terminals 164a and 164b from being deformed by the external force.

As shown in FIGS. 12 and 13, the spacer block 128 extending from the terminal base 161 is brought into contact with the connection surface 149 of the upper battery case 120 to prevent the battery holder 160 from being rattled. In addition to the clamping force of the spring terminals 164a and 164b, this structure further ensures the secure connection of the battery pack 110 with the battery holder 160 and effectively prevents chattering even in vibrating tools. As previously described, each electrode terminal assembly 141a (141b) comes into contact with the two electric conductive strips 165A and 165B of the spring terminal 164a (164b). This increases the contact area and favorably reduces the adverse effect of contact resistance even in motors with a large loading.

The upper battery case 120 of the battery pack 110 has a stepped portion 121. When the battery pack 110 is attached to the battery holder 160 fixed to the handle assembly 150, four corners of the stepped portion 121 are received by the corresponding notched portions 154 formed on the inner wall of the housing members 150a and 150b. This structure further ensures the secure attachment of the battery pack 110 to the power-driven tool.

As described previously, the battery pack 110 of the second embodiment includes the engagement member 136 disposed on the lower battery case 130. When the handle assembly 150 is provided with the set plate 177 as shown in FIG. 13, the set plate 177 may be used instead of the stop hooks 118 for the attachment of the battery pack 110.

In the second embodiment discussed above, the electrode terminal assemblies 141a and 141b set in the insertion slots 148a and 148b are clamped by the spring terminals 164a and 164b. The battery pack 110 has the side slots 147a and 147b as well as the insertion slots 148a and 148b. The side slots 147a and 147b allow the electrode terminal assemblies 141a and 141b to be exposed on the side faces thereof. This enables the battery pack 110 of the embodiment to be connected with the conventional power-driven tool having the different-shaped spring terminals 264a and 264b as illustrated in FIG. 14.

Instead of the two insertion slots 148a and 148b, one large insertion slot without a partition may be formed in the connection surface 149. Although each spring terminal 164a (164b) is reinforced by the reinforcement plates 127A and 127B in the second embodiment, these reinforcement plates 127A and 127B may be omitted.

The battery holder 110 of the second embodiment includes the six secondary cells 101 having the total capacity of 9.6 V. The battery holder may, however, be modified to include any number of secondary cells received in any desired shape of battery cases.

The attachment structure of the first or the second embodiment may include any number of spacers of any desired shape. The spacers may be made of an elastic material, such as rubber, and designed to be plate-like, block-like, or any other desired shape.

Although the spring terminals are extended from the terminal base of the battery holder in the above embodiments, the spring terminals may be disposed directly on a switch casing of a power-driven tool. In this structure, spacers formed on the switch casing exert the same effects as above.

In the embodiments discussed above, the positive and negative electrode terminal assemblies of the battery pack are electrically connected with the motor of the power-driven tool simultaneously with the insertion of the battery pack into the handle assembly of the power-driven tool. The principle of present invention is, however, also applicable to another structure that the thermo-terminal assembly or another terminal assembly is electrically connected with the motor of the power-driven tool simultaneously with the insertion of the battery pack.

There may be many other modifications, alternations, and changes without departing from the scope or spirit of essential characteristics of the invention. It is thus clearly understood that the above embodiments are only illustrative and not restrictive in any sense. The scope and spirit of the present invention are limited only by the terms of the appended claims.

What is claimed is:

1. An attachment structure to make a battery pack including a plurality of secondary cells detachably attached to a battery holder in a power-driven tool and realize electrical connection of said battery pack with said battery holder of said power-driven tool, said attachment structure comprising an insertion slot formed in a connection surface of said battery pack, said insertion slot having a predetermined width and defining at least one contact surface, a side slot formed in a side wall of said battery pack and connecting with said insertion slot, and a connection terminal projecting from said battery holder and arranged at a position corresponding to one of said insertion slot and said slide slot, wherein said connection terminal is inserted into one of said insertion slot and said side slot to make said battery pack electrically connect with said battery holder.

2. An attachment structure in accordance with claim 1, wherein said connection terminal comprises an insertion element having a width a little greater than the predetermined width of said insertion slot, said insertion element of said connection terminal being inserted into said insertion slot and thereby being pressed against said at least one contact surface of said insertion slot.

3. An attachment structure in accordance with claim 1, said attachment structure further comprising a pair of said connection terminals, a pair of said insertion slots, and a pair of first electrode terminal assemblies set in said respective insertion slots, said connection terminals being inserted into said insertion slots to come into contact with said first electrode terminal assemblies set in said insertion slots.

4. An attachment structure in accordance with claim 3, said attachment structure further comprising a pair of side slots formed in side walls of said battery pack connecting with said connection surface, each said side slot being connected with the corresponding insertion slot, and a pair of second electrode terminal assemblies set in said respective side slots.

5. An attachment structure in accordance with claim 4, wherein one of said first electrode terminal assemblies set in one of said insertion slots and one of said second electrode terminal assemblies set in the corresponding side slot connecting with said one insertion slot form an identical first pole, that is, a positive pole, whereas the other of said first electrode terminal assemblies set in the other of said insertion slots and the other of said second electrode terminal assemblies set in the corresponding side slot connecting with said the other insertion slot form an identical second pole, that is, a negative pole.

6. An attachment structure in accordance with claim 2, wherein said connection terminal comprises two strips of electric conductive plate, which are joined together on first ends thereof and bent symmetrically on second ends thereof to form said insertion element.

7. An attachment structure in accordance with claim 6, wherein said two strips of electric conductive plate are bent outward on the second ends thereof to be apart from each other.

8. An attachment structure in accordance with claim 6 wherein said two strips of electric conductive plate are bent inward on the second ends thereof to be close to each other.

9. An attachment structure in accordance with claim 2, wherein said connection terminal comprises one strip of electric conductive plate which is folded on a substantial center thereof, free ends of said electric conductive strip being bent either inward or outward to form said insertion element.

10. An attachment structure in accordance with claim 2, wherein said connection terminal comprises one strip of electric conductive plate which is bent inward or outward to form an U-shaped insertion element.

11. An attachment structure in accordance with claim 1, said attachment structure further comprising a projection formed along said connection terminal to prevent deformation of said connection terminal.

12. An attachment structure in accordance with claim 1, said attachment structure further comprising a spacer member interposed between said battery holder and said battery pack when said battery pack is attached to said battery holder.

13. An attachment structure to make a battery pack including a plurality of secondary cells detachably attached to a battery holder in a power-driven tool and realize electrical connection of said battery pack with said battery holder of said power-driven tool, said attachment structure comprising
- a connection terminal projected from a terminal base formed on said battery holder,
- an electrode terminal assembly disposed on said battery pack, said electrode terminal assembly being electrically connected with said connection terminal, and
- a spacer member interposed between said terminal base of said battery holder and said battery pack when said battery pack is attached to said battery holder.

14. An attachment structure to make a battery pack including a plurality of secondary cells detachably attached to a battery holder in a power-driven tool and realize electrical connection of said battery pack with said battery holder of said power-driven tool, said attachment structure comprising
- an insertion slot formed in a connection surface of said battery pack, said insertion slot having an inner wall,
- a side slot formed in a side wall of said battery pack and connecting with said insertion slot,
- an electrode terminal assembly set on one of said inner wall of said insertion slot and said side slot,
- a connection terminal for clamping said electrode terminal assembly fitted in one of said insertion slot and said side slot.

15. An attachment structure to make a battery pack including a plurality of secondary cells detachably attached to a battery holder in a power-driven tool and realize electrical connection of said battery pack with said battery holder of said power-driven tool, said attachment structure comprising
- a pair of insertion slots formed in a connection surface of said battery pack, each said insertion slot having an inner wall,
- a pair of side slots formed in side walls of said battery pack connecting with said connection surface, each said side slot being connected with the corresponding insertion slot,
- a positive electrode terminal assembly having a first surface and a second surface, said first surface of said positive electrode terminal assembly being set on the inner wall of one of said Insertion slots while said second surface of said positive electrode terminal assembly being set on the corresponding side slot connecting with said one insertion slot,
- a negative electrode terminal assembly having a first surface and a second surface, said first surface of said negative electrode terminal assembly being set on the inner wall of the other of said insertion slots while said second surface of said negative electrode terminal assembly being set on the corresponding side slot connecting with said the other insertion slot, and
- first and second connection terminals projected from said battery holder, each said connection terminal having a clamping element on one end thereof, said clamping element of said first connection terminal clamping said first surface and said second surface of said positive electrode terminal assembly, and said clamping element of said second connection terminal clamping said first surface and said second surface of said negative electrode terminal assembly.

16. An attachment structure in accordance with claim 15, wherein each said connection terminal comprises two strips of electric conductive plate, which are joined together on first ends thereof and bent symmetrically on second ends thereof to form said clamping element.

17. An attachment structure in accordance with claim 15, wherein said each connection terminal further comprises a reinforcement member formed along said each strip of electric conductive plate.

18. An attachment structure in accordance with claim 15, said attachment structure further comprising a spacer member interposed between said battery holder and said battery pack when said battery pack is attached to said battery holder.

19. An attachment structure to make a battery pack including a plurality of secondary cells detachably attached to a battery holder in a power-driven tool and realize electrical connection of said battery pack with said battery holder of said power-driven tool, said attachment structure comprising
- first and second insertion slots formed in a connection surface of said battery pack, each said insertion slot having an inner wall,
- first and second side slots formed in side walls of said battery pack connecting with said connection surface, each said side slot being connected with the corresponding insertion slot,
- a positive electrode terminal assembly having a first surface and a second surface, said first surface of said positive electrode terminal assembly being set on the inner wall of said first insertion slot while said second surface of said positive electrode terminal assembly being set on said first side slot connecting with said first insertion slot,
- a negative electrode terminal assembly having a first surface and a second surface, said first surface of said negative electrode terminal assembly being set on the inner wall of said second insertion slot while said second surface of said negative electrode terminal assembly being set on said second side slot connecting with said second insertion slot, and
- first and second connection terminals projected from said battery holder, each said connection terminal having an insertion element on one end thereof, said insertion element of said first connection terminal being inserted into said first insertion slot to be electrically connected with said positive electrode terminal assembly, and said insertion element of said second connection terminal being inserted into said second insertion slot to be electrically connected with said negative electrode terminal assembly.

20. An attachment structure in accordance with claim 1, said attachment structure further comprising
    a U-shaped terminal set in said insertion slot and said side slot, and
    a bridge of insulating material formed between said insertion slot and said side slot for electrically shielding a portion of said U-shaped terminal.

21. An attachment structure in accordance with claim 1, said attachment structure further comprising
    a pair of said connection terminals,
    a pair of said insertion slots,
    a pair of said side slots,
    a pair of U-shaped terminals set in said respective insertion slots and said respective side slots, and
    a pair of bridges of insulating material, each one of said bridges of insulating material formed between a respective one of said insertion slots and a respective one of said side slots for electrically shielding a portion of each of said U-shaped terminals.

22. An attachment structure in accordance with claim 13, said attachment structure further comprising a pair of spacer members extending from said terminal base and arranged in parallel to said connection terminal.

23. An attachment structure in accordance with claim 13, said attachment structure further comprising a pair of connection terminals and wherein said spacer member comprises a spacer block extending perpendicularly from said terminal base and arranged between said connection terminals.

24. A battery pack for use with a power tool having at least one connection terminal projecting from a battery holder, said battery pack comprising
    an insertion slot formed in a connection surface of said battery pack, said insertion slot having a predetermined width and defining at least one contact surface, and
    a side slot formed in a side wall of said battery pack and connecting with said insertion slot,
    wherein said connection terminal can be inserted into one of said insertion slot and said side slot to make said battery pack electrically connect with said battery holder.

25. The battery pack in accordance with claim 24, said battery pack further comprising
    a pair of said insertion slots,
    a pair of said side slots,
    a pair of U-shaped terminals set in said respective insertion slots and said respective side slots, and
    a pair of bridges of insulating material, each one of said bridges of insulating material formed between a respective one of said insertion slots and a respective one of said side slots for electrically shielding a portion of each of said U-shaped terminals.

26. A battery pack for use with a power tool having at least one connection terminal projecting from a battery holder, said battery pack comprising
    an insertion slot formed in a connection surface of said battery pack, said insertion slot having an inner wall,
    a side slot formed in a side wall of said battery pack and connecting with said insertion slot, and
    an electrode terminal assembly set on one of said inner wall of said insertion slot and said side slot,
    wherein said connection terminal can be inserted into one of said insertion slot and said side slot to clamp said electrode terminal assembly and thus, make said battery pack electrically connect with said battery holder.

27. The battery pack in accordance with claim 26, said battery pack further comprising
    a pair of said insertion slots,
    a pair of said side slots,
    a pair of U-shaped terminals set in said respective insertion slots and said respective side slots, and
    a pair of bridges of insulating material, each one of said bridges of insulating material formed between a respective one of said insertion slots and a respective one of said side slots for electrically shielding a portion of each of said U-shaped terminals.

* * * * *